(12) United States Patent
Shirai et al.

(10) Patent No.: US 6,393,377 B1
(45) Date of Patent: May 21, 2002

(54) DISTANCE MEASUREMENT APPARATUS

(75) Inventors: Noriaki Shirai; Yoshiaki Hoashi, both of Kariya; Takeshi Matsui, Toyohashi, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/429,164

(22) Filed: Oct. 28, 1999

(30) Foreign Application Priority Data

Nov. 2, 1998 (JP) ............................................. 10-312332

(51) Int. Cl.⁷ ........................... G01S 15/08; G01B 11/14
(52) U.S. Cl. ........................ 702/159; 342/118; 367/99; 702/79
(58) Field of Search ................... 702/159, 79; 356/582, 356/623; 369/112.09, 112.14, 112.21; 342/124, 118; 701/4; 367/94

(56) References Cited

U.S. PATENT DOCUMENTS

| | | | | |
|---|---|---|---|---|
| 4,743,083 A | * | 5/1988 | Schimpe ........................ | 385/37 |
| 4,744,040 A | * | 5/1988 | Kawata et al. ............... | 702/159 |
| 5,046,010 A | * | 9/1991 | Tomasi .......................... | 701/4 |
| 5,329,467 A | * | 7/1994 | Nagamune et al. .......... | 702/159 |
| 5,481,504 A | * | 1/1996 | Rosenbach et al. .......... | 367/101 |
| 5,689,265 A | * | 11/1997 | Otto et al. ................... | 342/124 |
| 5,696,516 A | * | 12/1997 | Julian .......................... | 342/118 |
| 5,715,060 A | * | 2/1998 | Sides .......................... | 356/623 |
| 5,827,943 A | * | 10/1998 | Schmidt ....................... | 73/1.73 |
| 6,122,602 A | * | 9/2000 | Michalski et al. ........... | 702/159 |
| 6,218,982 B1 | * | 4/2001 | Shirai et al. ................. | 342/118 |

FOREIGN PATENT DOCUMENTS

| | | |
|---|---|---|
| JP | 59-5981 | 1/1984 |
| JP | 5-312950 | 11/1993 |
| JP | 9-159765 | 6/1997 |

* cited by examiner

Primary Examiner—Marc S. Hoff
Assistant Examiner—Paul Kim
(74) Attorney, Agent, or Firm—Harness, Dickey & Pierce, PLC

(57) ABSTRACT

A distance measurement apparatus includes a transmitting device for transmitting a forward electromagnetic wave. A receiving device operates for receiving an echo wave caused by reflection of the forward electromagnetic wave at an object, and converting the received echo wave into a first received signal. A scattered-wave detecting device operates for detecting a scattered wave reaching the receiving device and caused by reflection of the forward electromagnetic wave at an obstacle which occurs prior to the reflection of the forward electromagnetic wave at the object. A cancel-signal generating device operates for generating a cancel signal to cancel a scattered-wave-corresponding component of the first received signal generated by the receiving device in response to the scattered wave detected by the scattered-wave detecting device. A scattered-wave canceling device operates for removing the scattered-wave-corresponding component from the first received signal in response to the cancel signal generated by the cancel-signal generating device to change the first received signal to a second received signal. A distance calculating device responsive to the second received signal operates for measuring a time interval between a moment of the transmission of the forward electromagnetic wave by the transmitting device and a moment of the reception of the echo wave by the receiving device, and calculating a distance to the object on the basis of the measured time interval.

6 Claims, 8 Drawing Sheets

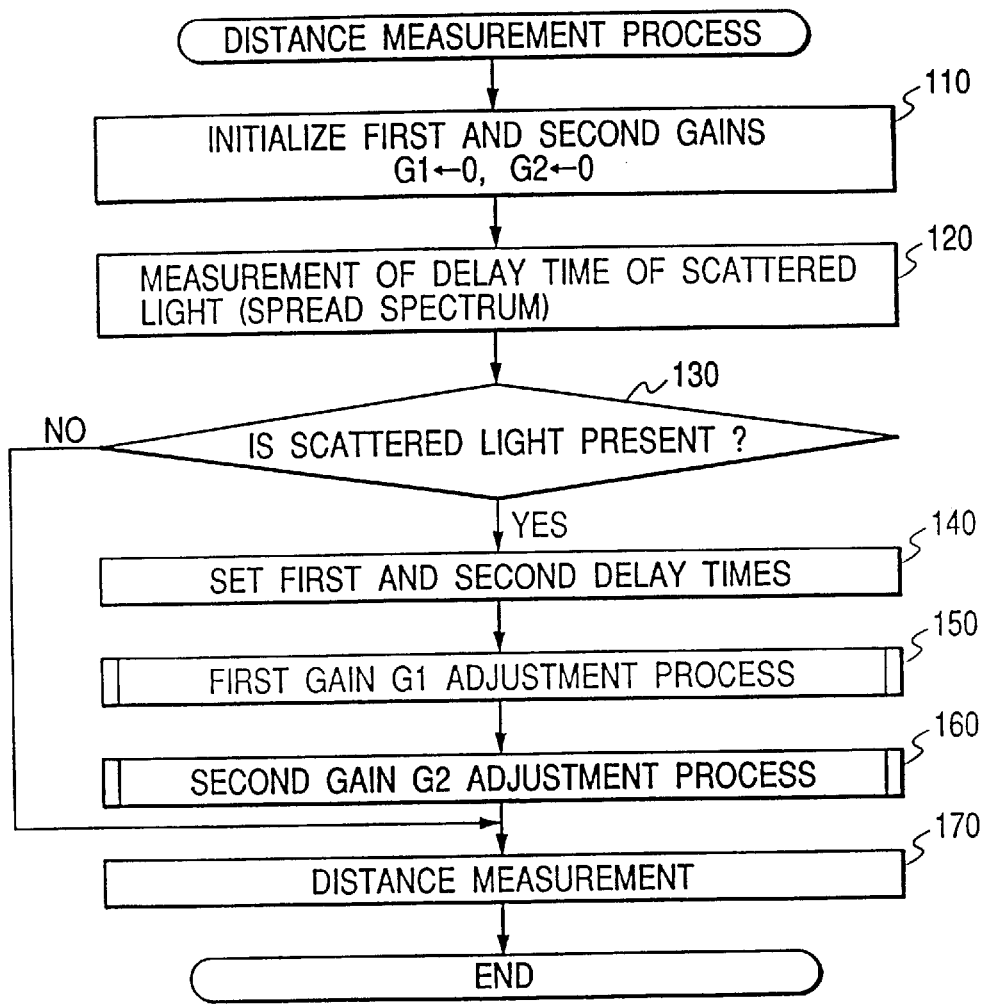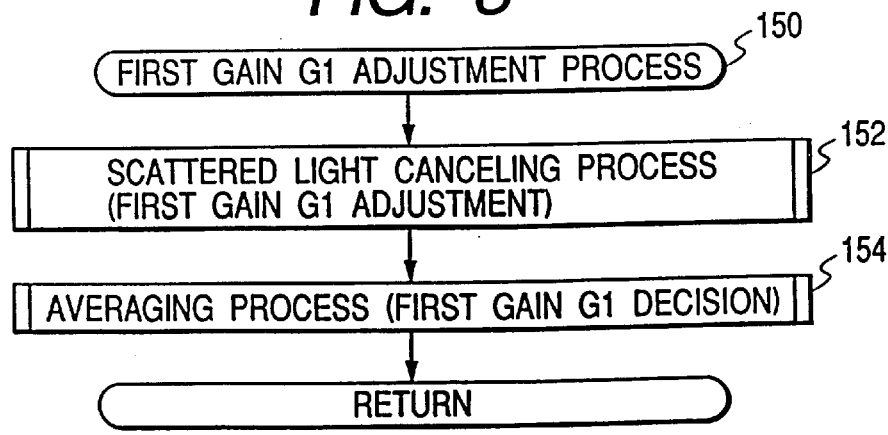

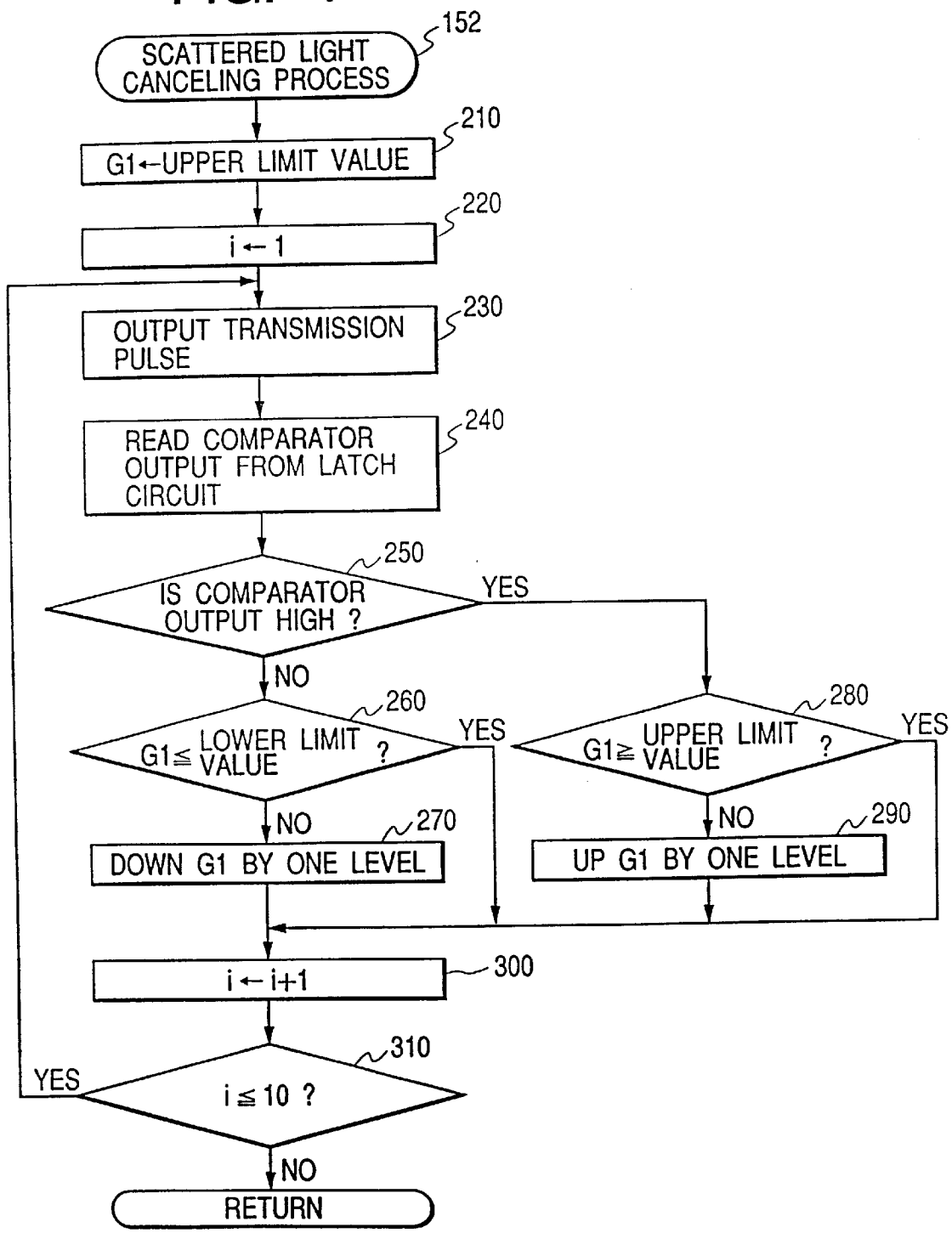

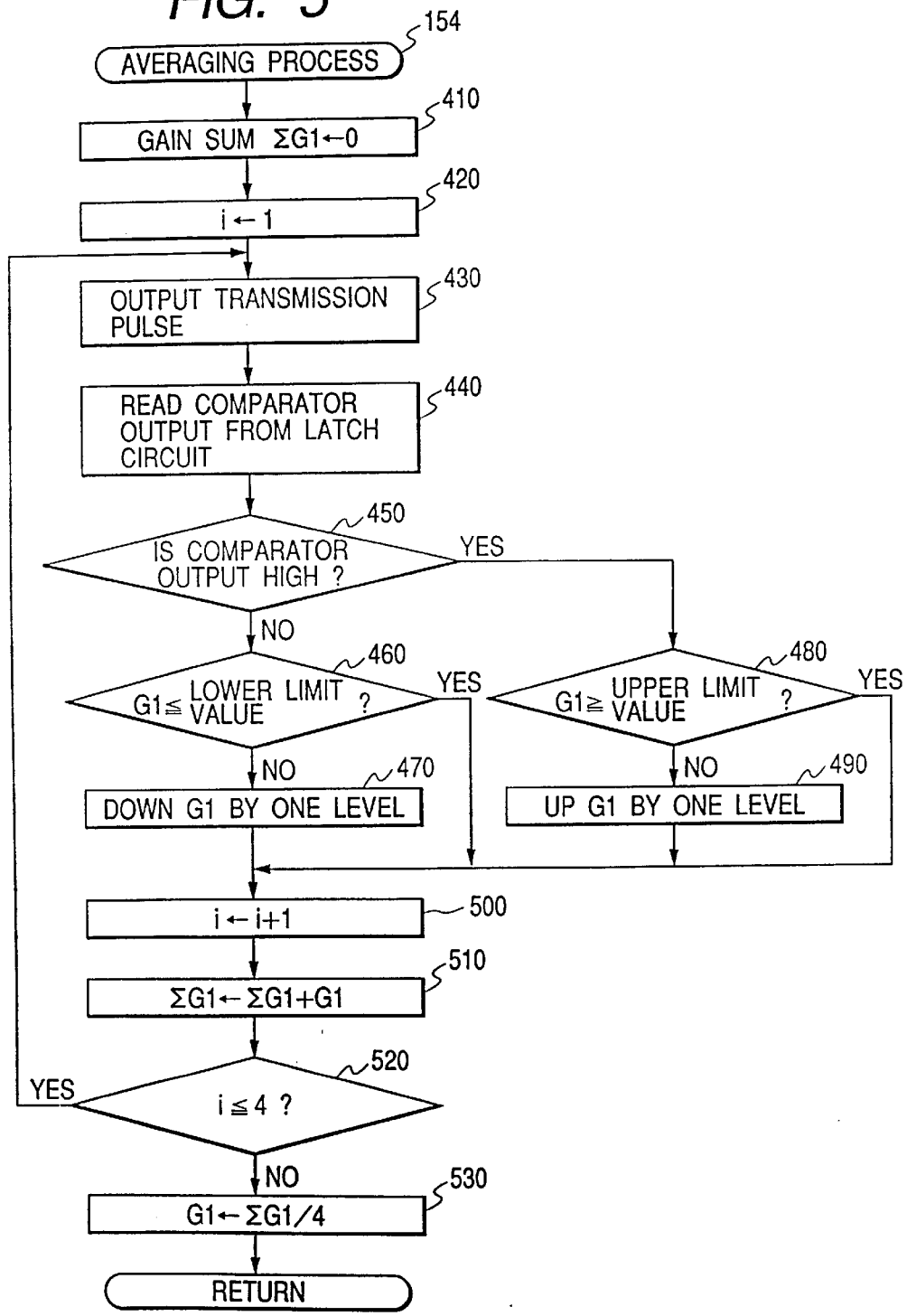

DISTANCE MEASUREMENT APPARATUS

BACKGROUND OF THE INVENTION

1. Field of the Invention

This invention relates to a distance measurement apparatus using an electromagnetic wave.

2. Description of the Related Art

There is a prior-art distance measurement apparatus mounted on an automotive vehicle which measures the distance between the present vehicle and a preceding target object such as a preceding vehicle. The prior-art apparatus emits a beam of an electromagnetic wave in a forward direction with respect to the body of the present vehicle. The prior-art apparatus receives an echo beam caused by reflection of the forward electromagnetic-wave beam at a preceding target object. Detection is made about the time interval between the moment of the emission of the forward beam and the moment of the reception of the echo beam. The prior-art apparatus measures the distance between the present vehicle and the preceding target object on the basis of the detected time interval.

In the case where a group of raindrops, a fog, or a spray of water occurs between the present vehicle and a preceding target object, the prior-art apparatus tends to inaccurately measure the distance between the present vehicle and the preceding target object for the reason as follows. A group of raindrops, a fog, and a spray of water reflects the forward electromagnetic-wave beam. The reflection of the forward beam thereat causes a scattered wave beam or an undesired echo beam. The prior-art apparatus responds to the undesired echo beam (the scattered wave beam), and hence fails to accurately measure the distance between the present vehicle and the preceding target object.

A first known way of removing such a problem is to disable a receiver in a distance measurement apparatus for a predetermined time interval after the moment of the emission of a forward electromagnetic-wave beam. The predetermined time interval is chosen to cover a time range during which an undesired echo beam (a scattered wave beam) is expected to reach the receiver. A second known way is to gradually increase the gain of a receiver in a distance measurement apparatus in accordance with the lapse of time from the moment of the emission of a forward electromagnetic-wave beam.

Japanese published unexamined patent application 5-312950 discloses a distance measurement apparatus which emits a leaser beam as a forward beam modulated in accordance with a maximum length code. The apparatus of Japanese application 5-312950 receives an echo beam caused by reflection of the forward beam at an object. The received echo beam is demodulated into a received signal. Detection is made about the phase error between the maximum length code related to the forward beam and a maximum length code represented by the received signal. The distance between the apparatus and the object is calculated from the detected phase error. The apparatus of Japanese application 5-312950 adjusts the gain of a transmitter or the gain of a receiver in response to the magnitude of the received signal. The adjustment-resultant gain is used for a next forward beam or a next echo beam.

The apparatus of Japanese application 5-312950 tends to inaccurately measure the distance between the apparatus and the object in the case where a group of raindrops, a fog, or a spray of water occurs therebetween. A group of raindrops, a fog, and a spray of water reflect the forward beam. The reflection of the forward beam thereat causes a scattered wave beam or an undesired echo beam. When the undesired echo beam (the scattered wave beam) is stronger than a desired echo beam caused by reflection of the forward beam at the object, the apparatus of Japanese application 5-312950 responds to the undesired echo beam and hence fails to accurately measure the distance between the apparatus and the object.

Japanese published unexamined patent application 9-159765 discloses a radar apparatus for a vehicle. The radar apparatus of Japanese application 9-159765 emits a forward light beam, and receives an echo light beam caused by reflection of the forward light beam at a preceding target object. The echo light beam is converted into measurement data. The distance between the present vehicle and the preceding target object is detected on the basis of the measurement data. In the radar apparatus of Japanese application 9-159765, a determination is made about whether or not the measurement data actually has a component corresponding to the echo light beam caused by reflection of the forward light beam at the preceding target object. Reference data is set on the basis of the measurement data which does not have a desired-echo-related component. The reference data represents undesired echo light beams (scattered light beams) caused by reflection of the forward light beam at waterdrops and snow grains. In the radar apparatus of Japanese application 9-159765, current measurement data is corrected in response to the reference data to prevent the undesired echo light beams from causing an error of distance measurement.

SUMMARY OF THE INVENTION

It is an object of this invention to provide a distance measurement apparatus which is less adversely affected by a group of raindrops, a fog, and a spray of water.

A first aspect of this invention provides a distance measurement apparatus comprising transmitting means for transmitting a forward electromagnetic wave; receiving means for receiving an echo wave caused by reflection of the forward electromagnetic wave at an object, and converting the received echo wave into a first received signal; scattered-wave detecting means for detecting a scattered wave reaching the receiving means and caused by reflection of the forward electromagnetic wave at an obstacle such as a group of raindrops or a fog which occurs prior to the reflection of the forward electromagnetic wave at the object; cancel-signal generating means for generating a cancel signal to cancel a scattered-wave-corresponding component of the first received signal generated by the receiving means in response to the scattered wave detected by the scattered-wave detecting means; scattered-wave canceling means for removing the scattered-wave-corresponding component from the first received signal in response to the cancel signal generated by the cancel-signal generating means to change the first received signal to a second received signal; and distance calculating means responsive to the second received signal for measuring a time interval between a moment of the transmission of the forward electromagnetic wave by the transmitting means and a moment of the reception of the echo wave by the receiving means, and calculating a distance to the object on the basis of the measured time interval.

A second aspect of this invention is based on the first aspect thereof, and provides a distance measurement apparatus wherein the scattered-wave detecting means comprises means for measuring a strength of the scattered-wavecorresponding component of the first received signal, and means for measuring a delay time between the moment of the transmission of the forward electromagnetic wave by the transmitting means and a moment of the reception of the scattered wave by the receiving means, and wherein the cancel-signal generating means comprises means for generating the cancel signal on the basis of the strength and the delay time measured by the scattered-wave detecting means and at a timing corresponding to the moment of the reception of the scattered wave by the receiving means.

A third aspect of this invention is based on the first aspect thereof, and provides a distance measurement apparatus wherein the transmitting means comprises pseudo-random-noise-code generating means for a pseudo random noise code having a predetermined bit length, means for modulating an electromagnetic wave into a modulated electromagnetic wave in response to the pseudo random noise code, and means for transmitting the modulated electromagnetic wave as the forward electromagnetic wave, and wherein the distance calculating means comprises demodulating means for demodulating the second received signal into a binary signal, correlation calculating means for calculating a value of a correlation between the binary signal and the pseudo random noise code used by the transmitting means, means for detecting a peak-occurrence moment at which the calculated correlation value is maximized, and means for calculating the distance to the object from the detected peak-occurrence moment.

A fourth aspect of this invention is based on the third aspect thereof, and provides a distance measurement apparatus wherein the scattered-wave detecting means comprises means for causing the transmitting means to transmit a forward electromagnetic wave modulated in response to a pseudo random noise code, means for measuring a time interval between a moment of the transmission of the forward electromagnetic wave by the transmitting means and a moment at which the correlation value calculated by the correlation calculating means, delay time setting means for setting the measured time interval as the delay time, means for causing the transmitting means to transmit the forward electromagnetic wave, and signal-level measuring means for detecting a level of the first received signal, generated by the receiving means at a moment the delay time after the moment of the transmission of the forward electromagnetic wave by the transmitting means, as a level of a scattered-wave signal component; and wherein the cancel-signal generating means comprises for delaying the pseudo random noise code by the delay time set by the delay time setting means after the transmitting means starts to transmit the forward electromagnetic wave which is modulated in response to the pseudo random noise code, level adjusting means for controlling a signal level of a pseudo random noise code outputted from the delaying means to the scattered-wave signal level detected by the signal-level measuring means, and means for applying an output signal of the level adjusting means to the scattered-wave canceling means as the cancel signal.

A fifth aspect of this invention is based on the fourth aspect thereof, and provides a distance measurement apparatus wherein the level adjusting means comprises first level adjusting means for adjusting the signal level of the pseudo random noise code outputted from the delaying means at an accuracy comparable to a signal level of white noise, and second level adjusting means for adjusting the signal level of the pseudo random noise code outputted from the delaying means at an accuracy finer than the signal level of white noise; and wherein the signal-level measuring means comprises first level setting means for causing the transmitting means to transmit the forward electromagnetic wave, for causing the delaying means and the scattered-wave canceling means to operate, for changing a quantity of the level adjustment by the first level adjusting means in response to a value of the binary signal generated by the demodulating means the delay time thereafter, and thereby setting the quantity of the level adjustment by the first level adjusting means so that the binary signal generated by the demodulating means will be evenly in its high-level state and its low-level state, and second level setting means for causing the transmitting means to transmit the forward electromagnetic wave after the first level setting means sets the quantity of the level adjustment, for causing the delaying means and the scattered-wave canceling means to operate, for measuring the binary signal generated by the demodulating means a plurality of times, for calculating a number of times the measured binary signal is in one of its high-level state and its low-level state during the plural-times measurement of the binary signal, and for setting a quantity of the level adjustment by the second level adjusting means in response to the calculated number of times so that a level of a signal from which a scattered-wave component has been removed and which is inputted into the demodulating means will be smaller than the signal level of white noise.

A sixth aspect of this invention is based on the first aspect thereof, and provides a distance measurement apparatus wherein the cancel-signal generating means comprises means for limiting a level of the cancel signal to a predetermined upper limit.

BRIEF DESCRIPTION OF THE DRAWINGS

FIG. 2 is a flowchart of a distance measuring segment of a program for a microcomputer in FIG. 1.

FIG. 3 is a flowchart of a first gain adjustment block in FIG. 2.

FIG. 4 is a flowchart of a first block in FIG. 3.

FIG. 5 is a flowchart of a second block in FIG. 3.

DESCRIPTION OF THE PREFERRED EMBODIMENTS

First Embodiment

Figure 1:
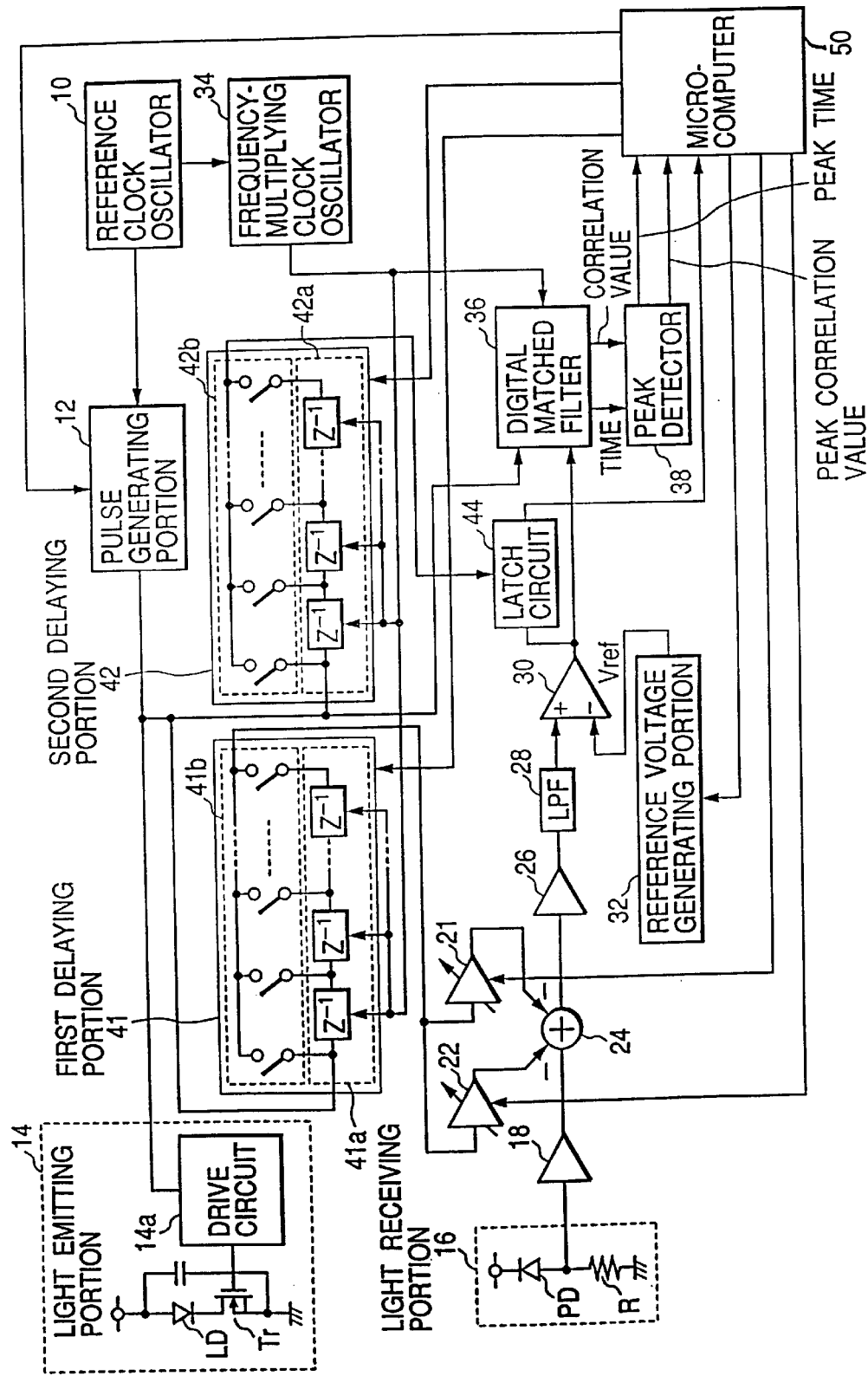
FIG. 1 is a diagram of a distance measurement apparatus according to a first embodiment of this invention.

FIG. 1 shows a distance measurement apparatus according to a first embodiment of this invention. The apparatus of FIG. 1 uses a spread spectrum technique. For example, the apparatus of FIG. 1 is mounted on an automotive vehicle, and operates to measure a distance between the present vehicle and a preceding target object such as a preceding vehicle.

The apparatus of FIG. 1 includes a reference clock oscillator (a reference clock signal generator) 10, a pulse generating portion 12, and a light emitting portion 14. The reference clock oscillator 10 generates a reference clock signal having a predetermined frequency, for example, 20 MHz. The pulse generating portion 12 receives the reference clock signal from the reference clock oscillator 10. The pulse generating portion 12 produces a pseudo-noise (PN) code or a pulse signal in synchronism with the reference clock signal. The PN code is, for example, a maximum length code. The pulse generating portion 12 acts as a pseudo random noise code generating means. The light emitting portion 14 receives the maximum length code or the pulse signal from the pulse generating portion 12. The light emitting portion 14 generates a beam of an electromagnetic wave subjected to amplitude modulation responsive to the maximum length code or the pulse signal. The light emitting portion 14 transmits the beam of the electromagnetic wave in a forward direction with respect to the body of the present vehicle. The amplitude modulation is, for example, intensity modulation. The beam of the electromagnetic wave is, for example, a beam of laser light.

The light emitting portion 14 includes a laser diode LD, a drive transistor Tr, and a drive circuit 14a. The laser diode LD operates to emit a laser beam in the forward direction with respect to the body of the present vehicle. The transistor Tr is interposed in a power feed line to the laser diode LD. The transistor Tr acts to activate and deactivate the laser diode LD, that is, to allow and inhibit the emission of the forward laser beam. The transistor Tr is, for example, an n-channel MOSFET. The drive circuit 14a receives the output signal (the maximum length code or the pulse signal) of the pulse generating portion 12. The drive circuit 14a is connected to the control electrode (the gate) of the transistor Tr. The drive circuit 14a turns on the transistor Tr when the output signal of the pulse generating portion 12 is in its high-level state. The drive circuit 14a turns off the transistor Tr when the output signal of the pulse generating portion 12 is in its low-level state.

In the case where the pulse generating portion 12 outputs the maximum length code, the drive circuit 14a turns on and off the transistor Tr in response to the logic states ("1" and "0") of bits of the maximum length code. In this case, the laser diode LD emits a forward laser beam subjected to intensity modulation responsive to the maximum length code.

In the case where the pulse generating portion 12 outputs a high-level signal as the pulse signal, the drive circuit 14a turns on the transistor Tr in response to the high-level signal. In this case, the laser diode LD emits a forward laser beam with a constant intensity for the duration of the high-level signal.

In the case where the light emitting portion 14 receives the maximum length code from the pulse generating portion 12, the amplitude of the forward laser beam emitted from the light emitting portion 14 is maximized when the logic state of the maximum length code is "1", and is minimized when the logic state of the maximum length code is "0". Thus, the forward laser beam is subjected to amplitude modulation responsive to the maximum length code.

The pulse generating portion 12 selectively produces the maximum length code or the pulse signal in response to a control signal fed from a microcomputer 50 which will be mentioned later.

The apparatus of FIG. 1 includes a light receiving portion 16, a preamplifier 18, a first variable-gain amplifier 21, a second variable-gain amplifier 22, and a signal adding portion 24. The forward laser beam outputted from the light emitting portion 14 is reflected by a preceding target object such as a preceding vehicle. The reflection of the forward laser beam at the preceding target object causes an echo beam (a desired echo beam) which returns toward the apparatus. The light receiving portion 16 receives an echo beam, and converts the received echo beam into a received signal. The light receiving portion 16 acts as a receiving means. The preamplifier 18 is fed with the received signal from the light receiving portion 16. The preamplifier 18 amplifies the received signal. The preamplifier 18 outputs the amplification-resultant signal to the signal adding portion 24. The signal adding portion 24 receives output signals of the first variable-gain amplifier 21 and the second variable-gain amplifier 22 which are cancel signals. The signal adding portion 24 mixes or combines the output signals of the preamplifier 18, the first variable-gain amplifier 21, and the second variable-gain amplifier 22 into a correction-resultant received signal. Specifically, the signal adding portion 24 subtracts the output signals of the first variable-gain amplifier 21 and the second variable-gain amplifier 22 from the output signal of the preamplifier 18. Thus, the correction-resultant received signal results from the subtraction of the cancel signals from the output signal of the preamplifier 18. The signal adding portion 24 acts as a scattered wave canceling means.

The light receiving portion 16 includes a resistor R and a photodiode PD. The photodiode PD is connected via the resistor R to a power feed line in a reverse bias state. When an echo beam is incident to the photodiode PD, a photo-caused current flows therethrough. The resistor R converts the photo-caused current into a voltage signal which is outputted to the preamplifier 18 as a received signal.

An amplifier 26 receives the correction-resultant received signal from the signal adding portion 24, and amplifies the correction-resultant received signal at a fixed gain. The fixed-gain amplifier 26 outputs the amplification-resultant signal to a low pass filter 28. The low pass filter 28 removes noise components in a predetermined high frequency band from the output signal of the fixed-gain amplifier 26. The low pass filter 28 outputs the resultant signal to a first input terminal of a comparator 30. The comparator 30 converts the output signal of the low pass filter 28 into a binary signal. Specifically, a reference voltage generating portion 32 is controlled by the microcomputer 50 to produce a reference voltage Vref. The reference voltage generating portion 32 applies the reference voltage Vref to a second input terminal of the comparator 30. The comparator 30 compares the output signal of the low pass filter 28 and the reference voltage Vref. The binary signal generated by the comparator 30 is in its high-level state when the voltage of the output signal of the low pass filter 28 is higher than the reference voltage Vref. The binary signal is in its low-level state when the voltage of the output signal of the low pass filter 28 is equal to or lower than the reference voltage Vref. The comparator 30 acts as a demodulating means.

The comparator 30 outputs the binary signal to a digital matched filter 36 and a latch circuit 44. A frequency-multiplying clock oscillator 34 receives the reference clock signal from the reference clock oscillator 10. The frequency-multiplying clock oscillator 34 multiplies the frequency of the reference clock signal by 5, and thereby generates a second clock signal having a frequency of, for example, 100 MHz. The matched filter 36 receives the second clock signal from the frequency-multiplying clock oscillator 34. The matched filter 36 operates in response to the second clock signal.

The matched filter 36 receives the maximum length code from the pulse generating portion 12. The matched filter 36 latches the maximum length code as a transmitted code. The matched filter 36 is fed with the binary signal from the comparator 30. The matched filter 36 accepts the binary signal in synchronism with the second clock signal. The matched filter 36 periodically latches the binary signal as a received code for a time period corresponding to the bit length of the transmitted code. The matched filter 36 calculates a correlation between the latched transmitted code and the latched received code which is periodically updated. The matched filter 36 acts as a correlation calculating means.

The matched filter 36 uses a known way of calculating a correlation. In the calculation of the correlation by the matched filter 36, a correlation value is computed for every corresponding bits of the latched transmitted code and the latched received code.

The correlation value is set to "1" for corresponding bits where the logic state of the latched transmitted code and the logic state of the latched received code are equal to each other. The correlation value is set to "−1" for corresponding bits where the logic state of the latched transmitted code and the logic state of the latched received code are different from each other. The correlation values for the respective bits are summed into an integrated correlation value which corresponds to the whole of the latched received code. An integrated correction value is available each time the latched received code is updated.

The matched filter 36 informs a peak detector 38 of every integrated correlation value. The matched filter 36 contains a device for counting pulses of the second clock signal to generate information of a calculation time at which every integrated correction value is available. The calculation time is equal to the lapse of time from the start of calculation of an integrated correlation value between the latched transmitted code and the first latched received code. The matched filter 36 informs the peak detector 38 of every calculation time. The peak detector 38 detects a moment (a peak-occurrence moment) at which the integrated correlation value calculated by the matched filter 36 is maximized. In other words, the peak detector 38 detects the time interval between the moment of the start of the correlation-value calculation by the matched filter 36 and a moment at which the integrated correlation value is maximized. Also, the peak detector 38 detects the maximum integrated correlation value (the peak correlation value). The peak detector 38 informs the microcomputer 50 of the detection results, that is, the peak-occurrence moment and the peak correlation value.

The microcomputer 50 includes a combination of an interface, a CPU, a ROM, and a RAM. The microcomputer 50 operates in accordance with a program stored in the ROM. The microcomputer 50 calculates the distance between the present vehicle and the preceding target object (the preceding vehicle) from the peak-occurrence moment given by the peak detector 38.

It is assumed that an obstacle (a jammer) to distance measurement such as an group of raindrops, a fog, or a spray of water occurs between the present vehicle and a preceding target object. The obstacle reflects the forward laser beam. The reflection of the forward beam thereat causes a scattered light beam or an undesired echo beam which returns to the apparatus. In this case, the received signal or the output signal of the preamplifier 18 has a component corresponding to the scattered light beam (the undesired echo beam).

A first delaying portion 41 and a second delaying portion 42 receive the output signal of the pulse generating portion 12. The first delaying portion 41 and the second delaying portion 42 defer the output signal of the pulse generating portion 12. The first delaying portion 41 outputs the resultant signal to the first variable-gain amplifier 21 and the second variable-gain amplifier 22. The second delaying portion 42 outputs the resultant signal to the latch circuit 44. The first delaying portion 41 and the second delaying portion 42 are controlled by the microcomputer 50. The microcomputer 50 implements a distance measurement process having a step of determining whether or not a scattered light beam (an undesired echo beam) caused by an obstacle to distance measurement is received. The distance measurement process also has a step of calculating the interval between the moment of the emission of the forward laser beam and the moment of the reception of a scattered light beam. When it is determined that a scattered light beam is received, the microcomputer 50 controls the first delaying portion 41 and the second delaying portion 42 to generate cancel signals for removing a scattered-light component from the output signal of the preamplifier 18. Specifically, the first delaying portion 41 is controlled to defer the output signal of the pulse generating portion 12 by a time equal to the interval between the moment of the emission of the forward laser beam and the moment of the reception of a scattered light beam. The second delaying portion 42 is controlled to defer the output signal of the pulse generating portion 12 by a time equal to a given interval plus the interval between the moment of the emission of the forward laser beam and the moment of the reception of a scattered light beam. The given interval is equal to 30 nsec, that is, three periods of the second clock signal generated by the frequency-multiplying clock oscillator 34.

The first delaying portion 41 includes a shift register 41a and a selector 41b. The shift register 41a receives the output signal of the pulse generating portion 12. The shift register 41a receives the second clock signal from the frequency-multiplying clock oscillator 34. The shift register 41a delays the output signal of the pulse generating portion 12 in synchronism with the second clock signal. The shift register 41a has a signal propagation line formed by a series combination of delay elements "$Z^{-1}$" and provided with taps. The selector 41b selects one of the taps in response to a control signal fed from the microcomputer 50. The selector 41b transmits a signal from the selected tap to the first variable-gain amplifier 21 and the second variable-gain amplifier 22 as a delayed signal. In other words, the first delaying portion 41 outputs the delayed signal to the first variable-gain amplifier 21 and the second variable-gain amplifier 22. The signal delay provided by the first delaying portion 41 depends on which of the taps is selected. Accordingly, the signal delay provided by the first delaying portion 41 is controlled by the microcomputer 50.

The first variable-gain amplifier 21 is controlled by the microcomputer 50 to subject the output signal of the first delaying portion 41 to level adjustment. The first variable-gain amplifier 21 outputs the resultant signal to the signal adding portion 24 as a cancel signal. Also, the second variable-gain amplifier 22 is controlled by the microcomputer 50 to subject the output signal of the first delaying portion 41 to level adjustment. The second variable-gain amplifier 22 outputs the resultant signal to the signal adding portion 24 as a cancel signal.

The first variable-gain amplifier 21 and the second variable-gain amplifier 22 are operated at gains equal to or less than "1". Therefore, the first variable-gain amplifier 21 and the second variable-gain amplifier 22 act as variable-gain attenuators. The gain of the first variable-gain amplifier 21 and the gain of the second variable-gain amplifier 22 are adjusted by control signals fed from the microcomputer 50. Specifically, the gain of the first variable-gain amplifier 21 can be adjusted stepwise at an accuracy comparable to the level of white noise in the apparatus. In other words, the gain of the first variable-gain amplifier 21 can be adjusted stepwise at a resolution comparable to the white noise level. On the other hand, the gain of the second variable-gain amplifier 22 can be adjusted stepwise at an accuracy higher than that corresponding to the level of white noise in the apparatus. In other words, the gain of the second variable-gain amplifier 22 can be adjusted stepwise at a resolution higher than that corresponding to the white noise level. The first variable-gain amplifier 21 acts as a first level adjusting means. The second variable-gain amplifier 22 acts as a second level adjusting means.

The second delaying portion 42 includes a shift register 42a and a selector 42b. The shift register 42a receives the output signal of the pulse generating portion 12. The shift register 42a receives the second clock signal from the frequency-multiplying clock oscillator 34. The shift register 42a delays the output signal of the pulse generating portion 12 in synchronism with the second clock signal. The shift register 42a has a signal propagation line formed by a series combination of delay elements "$Z^{-1}$" and provided with taps. The selector 42b selects one of the taps in response to a control signal fed from the microcomputer 50. The selector 42b transmits a signal from the selected tap to the latch circuit 44. In other words, the second delaying portion 42 outputs the delayed signal to the latch circuit 44. The signal delay provided by the second delaying portion 42 depends on which of the taps is selected. Accordingly, the signal delay provided by the second delaying portion 42 is controlled by the microcomputer 50.

The latch circuit 44 receives the output signal (the binary signal) of the comparator 30. The latch circuit 44 latches the output signal of the comparator 30 at a timing determined by every rising edge in the output signal of the second delaying portion 42. The latch circuit 44 outputs the latched signal to the microcomputer 50.

The distance measurement process implemented by the microcomputer 50 will be explained hereinafter. As previously indicated, the microcomputer 50 operates in accordance with a program stored in its internal ROM. FIG. 2 is a flowchart of a segment of the program which relates to the distance measurement process. The program segment in FIG. 2 is executed for every predetermined time interval.

As shown in FIG. 2, a first block 110 of the program segment sets the gain G1 of the first variable-gain amplifier 21 and the gain G2 of the second variable-gain amplifier 22 to "0". As a result, the output signal of the preamplifier 18 passes through the signal adding portion 24 without being processed thereby, and then reaches the fixed-gain amplifier 26.

A block 120 following the block 110 implements a delay time measurement process (a time lag measurement process). Specifically, the block 120 controls the pulse generating portion 12 to produce a short maximum length code, that is, a maximum length code having a bit length (for example, 15 bits) smaller than the bit length (for example, 127 bits) of a normal maximum length code used in a main stage of distance measurement. The light emitting portion 14 outputs a forward laser beam corresponding to the short maximum length code. Then, the block 120 derives a peak-occurrence moment from the output signal of the peak detector 38. In the case where an obstacle (a jammer) to distance measurement such as a group of raindrops, a fog, or a spray of water occurs between the present vehicle and a preceding target object (a preceding vehicle), the forward laser light is reflected thereat and causes a scattered light beam which returns to the apparatus. The block 120 measures a time lag or a delay time regarding the scattered light beam from the peak-occurrence moment.

Figure 7:
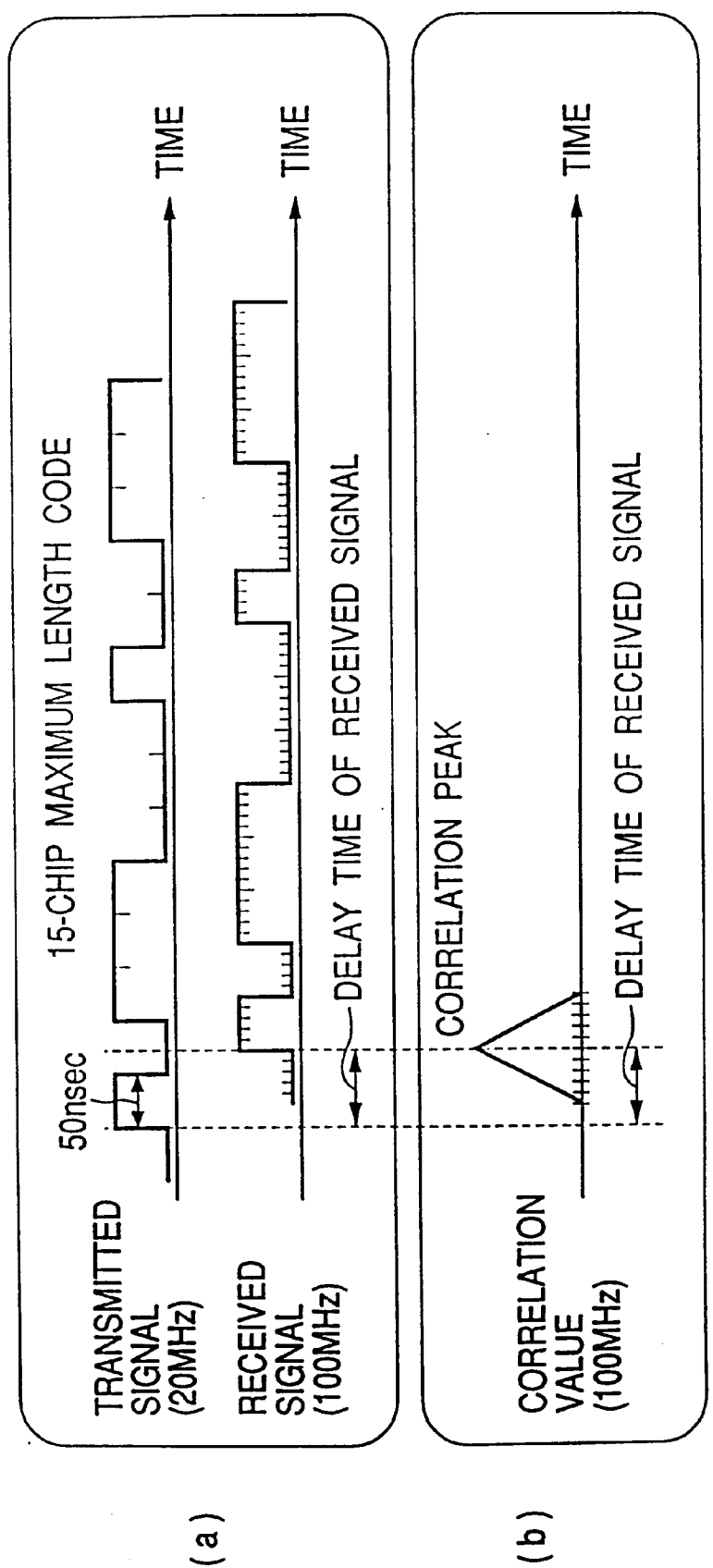
FIG. 7 is a time-domain diagram of a transmitted signal, a received signal, and a correlation value in the apparatus of FIG. 1.

In more detail, the light emitting portion 14 outputs a forward laser beam corresponding to the 15-bit maximum length code. It is assumed that an obstacle to distance measurement which extends between the present vehicle and a preceding target object (a preceding vehicle) reflects the forward laser light, and causes a scattered light beam which returns to the apparatus. In this case, as shown in the portion (a) of FIG. 7, the received signal outputted from the light receiving portion 16 delays from the transmitted signal of the 15-bit maximum length code by a time (a delay time or a time lag) corresponding to the distance between the apparatus and the obstacle. As shown in the portion (b) of FIG. 7, at the end of the delay time, the integrated correlation value calculated by the matched filter 36 is maximized. The block 120 derives a peak-occurrence moment from the output signal of the peak detector 38. At the peak-occurrence moment, the integrated correlation value calculated by the matched filter 36 is maximized. The block 120 measures the time lag (the delay time) of the received signal relative to the transmitted signal from the peak-occurrence moment.

It is preferable that during the measurement of the time lag of the received signal by the block 120, the peak detector 38 is controlled by the microcomputer 50 to execute peak detection only for a time interval (a detection time interval) of 0 nsec to 100 nsec after the end of the emission of the forward laser beam from the light emitting portion 14. This setting of the detection time interval is based on the assumption that a detectable obstacle is distant from the present vehicle by 15 m or less. Also, the setting of the detection time interval is made in view of the fact that the distance traveled by light for 1 nsec is equal to 30 cm (the distance traveled forward and backward by light for 1 nsec is equal to 15 cm). In the case where the apparatus can detect an obstacle distant from the present vehicle by more than 15 m, the detection time interval may be set to a value greater than 100 nsec.

The block 120 determines whether or not a peak-occurrence moment is detected by the peak detector 38 for the detection time interval. In the case where a peak-occurrence moment is detected for the detection time interval, the block 120 calculates the time lag of the scattered light beam (the time lag of the received signal relative to the transmitted signal) from the peak-occurrence moment. On the other hand, in the case where a peak-occurrence moment is not detected for the detection time interval, the block 120 does not implement the calculation of the time lag of the scattered light beam.

A block 130 following the block 120 determines whether or not a scattered light beam caused by an obstacle (a jammer) such as a group of raindrops, a fog, or a spray of water is received by the light receiving portion 16 on the basis of the calculation of the time lag by the block 120 and the peak correction value given by the peak detector 38.

In some cases, the level of the received signal is low as compared with the level of white noise in the apparatus although a peak correlation value is detected by the peak detector 38 for the detection time interval. In these cases, the detected correlation peak value is small. A threshold value for a detected peak correlation value is preset. The threshold value is slightly greater than a peak correlation value caused by white noise in the apparatus. The block 130 compares the detected correlation peak value with the threshold value. When the detected correlation peak value is smaller than the threshold value, the block 130 determines that a scattered light beam is not received by the light receiving portion 16. When the detected correlation peak value is equal to or greater than the threshold value, the block 130 determines that a scattered light beam is received by the light receiving portion 16.

The blocks 120 and 130 act as a delay time setting means. The pulse generating portion 12 produces a maximum length code in response to the reference clock signal. The matched filter 36 calculates a correlation value in synchronism with the second clock signal which has a frequency (100 MHz) equal to five times the frequency of the reference clock signal. Accordingly, a peak-occurrence moment is calculated at a time resolution corresponding to 10 nsec (1/100 MHz). Thus, the time lag or the delay time of the received signal relative to the transmitted signal can be measured at an accuracy equal to five times an accuracy (a time resolution corresponding to 50 nsec) available in an assumed case where the matched filter 36 directly responds to the reference clock signal.

The block 120 controls the reference voltage generating portion 32 to set the reference voltage Vref to a DC level of the received signal outputted from the low pass filter 28. The reference voltage Vref is applied to the comparator 30. Since the measurement of the time lag of the scattered light beam by the block 120 uses a spread spectrum technique, it is possible to prevent the measurement result from being adversely affected by white noise in the apparatus.

When the block 130 determines that a scattered light beam is not received by the light receiving portion 16, the program advances from the block 130 to a block 170 for measuring the distance between the present vehicle and a preceding target object (a preceding vehicle) according to a spread spectrum technique. On the other hand, when the block 130 determines that a scattered light beam is received by the light receiving portion 16, the program advances from the block 130 to a block 140.

The block 140 sets the delay time of the first delaying portion 41 and the delay time of the second delaying portion 42 on the basis of the time lag of the scattered light beam which is measured by the step 120. Specifically, the block 140 equalizes the delay time of the first delaying portion 41 to the time lag of the scattered light beam. The block 140 sets the delay time of the second delaying portion 42 equal to a given time plus the time lag of the scattered light beam. The given time is equal to 30 nsec, that is, three periods of the second clock signal generated by the frequency-multiplying clock oscillator 34.

A block 150 following the block 140 adjusts the gain G1 of the first variable-gain amplifier 21. Thus, the block 150 implements a first gain (G1) adjustment process. The block 150 acts as a first level setting means. A block 160 subsequent to the block 150 adjusts the gain G2 of the second variable-gain amplifier 22. Thus, the block 160 implements a second gain (G2) adjustment process. The block 160 acts as a second level setting means. After the block 160, the program advances to the block 170.

The processes implemented by the steps 120–160 compose a preliminary process which precedes a main distance measurement process by the block 170.

The block 170 implements a main distance measurement process using a spread spectrum technique. Specifically, the block 170 measures the distance between the present vehicle and a preceding target object (a preceding vehicle) according to a spread spectrum technique. The block 170 controls the pulse generating portion 12 to produce a 127-bit maximum length code. The pulse generating portion 12 outputs the 127-bit maximum length code to the light emitting portion 14. The light emitting portion 14 outputs a forward laser beam in response to the 127-bit maximum length code. The light receiving portion 16 outputs a received signal having a component corresponding to an echo beam caused by reflection of the forward laser beam at the preceding target object. The distance between the present vehicle and the preceding target object is measured by referring to the temporal relation between the echo-beam-related received signal and the 127-bit maximum length code outputted from the pulse generating portion 12. After the block 170, the current execution cycle of the program segment ends.

The gain adjustment by the block 150 is designed so that the first variable-gain amplifier 21 can generate a cancel signal for removing a scattered-light component, which is greater in level than white noise, from the received signal (the output signal of the preamplifier 18).

As shown in FIG. 3, the block 150 has a first sub block 152 and a second sub block 154. The first sub block 152 implements a process of cancelling a scattered-light signal component (a scattered-light-component cancelling process). Specifically, the first sub block 152 actually operates the first variable-gain amplifier 21. The first sub block 152 adjusts the gain GI of the first-variable gain amplifier 21 to cancel a scattered-light component of the received signal. The second sub block 154 follows the first sub block 152. The second sub block 154 implements an averaging process. Specifically, the second sub block 154 implements a further gain adjustment process, and provides a plurality of adjustment-resultant values of the gain G1 on the basis of the gain value given by the first sub block 152. The second sub block 154 calculates a mean value among the adjustment-resultant values of the gain G1. The second sub block 154 determines a final desired value of the gain G1 on the basis of the calculated mean value. The second sub block 154 sets the gain G1 of the first variable-gain amplifier 21 to the final desired value.

As shown in FIG. 4, a first step 210 in the sub block 152 sets the gain G1 of the first variable-gain amplifier 21 to a predetermined upper limit value. The predetermined upper limit value is chosen so that a strongest scattered-light component can be removed from the received signal. In the case where a preceding target object (a preceding vehicle) is close to the present vehicle, the received signal has a desired component corresponding to an echo beam caused by the preceding target object. This desired signal component is significantly higher in level than a scattered-light signal component. The purpose of the step 210 is to prevent the desired signal component from being erroneously canceled. Thus, it is possible to reliably detect the preceding target object, and to accurately measure the distance between the present vehicle and the preceding target object.

A step 220 following the step 210 sets a counter value "i" to an initial value, that is, "1". The counter value "i" indicates the number of times of adjustment of the gain G1. After the step 220, the program advances to a step 230.

The step 230 controls the pulse generating portion 12 to produce a single pulse in synchronism with the reference clock signal. The single pulse has a width of 50 nsec. The pulse generating portion 12 outputs the single pulse to the light emitting portion 14. The light emitting portion 14 outputs a forward laser beam in response to the single pulse.

The crest value of the forward laser beam outputted from the light emitting portion 14 at this time is equal to that of the forward laser beam emitted in response to the 15-bit maximum length code by the block 120, and is also equal to that of the forward laser beam emitted in response to the 127-bit maximum length code by the block 170. In addition, the step 230 controls the reference voltage generating portion 32 to set the reference voltage Vref to a DC level of the received signal outputted from the low pass filter 28. The reference voltage Vref is applied to the comparator 30. The setting of the reference voltage Vref to the DC level is to allow an accurate determination about a condition of the cancel of a scattered-light component from the output signal of the comparator 30.

It is assumed that an obstacle (a jammer) to distance measurement such as a group of raindrops, a fog, or a spray of water occurs between the present vehicle and a preceding target object. The obstacle reflects the forward laser beam. The reflection of the forward beam thereat causes a scattered light beam or an undesired echo beam which returns to the apparatus. In this case, the light receiving portion 16 outputs a scattered-light received signal at a timing which follows the moment of the emission of the forward laser beam by a time interval equal to the time lag or the delay time measured by the block 120.

The first delaying portion 41 and the second delaying portion 42 receive the single pulse from the pulse generating portion 12. The first delaying portion 41 delays the received pulse by a time interval equal to the time lag (the delay time) measured by the block 120. The first delaying portion 41 outputs the delayed pulse to the first variable-gain amplifier 21 and the second variable-gain amplifier 22. The first variable-gain amplifier 21 attenuates the delayed pulse at the gain GI, and outputs the resultant pulse to the signal adding portion 24 as a cancel signal. The second variable-gain amplifier 22 attenuates the delayed pulse at the gain G2, and outputs the resultant pulse to the signal adding portion 24 as a cancel signal. The signal adding portion 24 mixes or combines the output signal of the preamplifier 18 (the scattered-light received signal), the output pulse from the first variable-gain amplifier 21, and the output pulse from the second variable-gain amplifier 22.

At this time, since the gain G2 of the second variable-gain amplifier 22 is equal to "0", the received signal is not affected by the output signal of the second variable-gain amplifier 22 when passing through the signal adding portion 24. The output signal of the first variable-gain amplifier 21 is subtracted from the received signal in the signal adding portion 24. In other words, the received signal is reduced by a signal level corresponding to the output pulse from the first variable-gain amplifier 21. In the case where the gain G1 of the first variable-gain amplifier 21 is proper, a scattered-light component is almost fully removed from the received signal so that the comparator 30 receives a signal from the low pass filter 28 which has only components corresponding to white noise in the apparatus. In this case, the output signal of the comparator 30 is indeterminate due to the white noise components. Thus, the output signal of the comparator 30 is in its high-level state or its low-level state at about a 50% probability.

Figure 8:
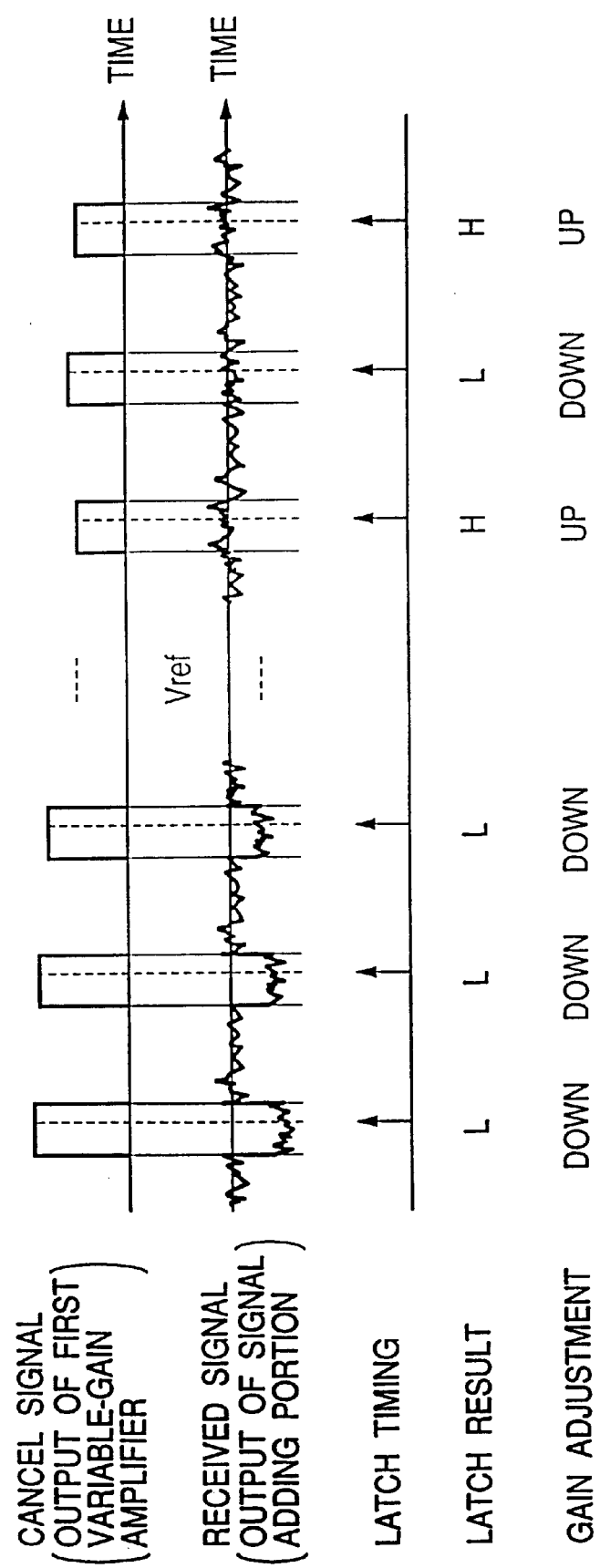
FIG. 8 is a time-domain diagram of a cancel signal, a received signal, a latch timing, a latch result, and a condition of gain adjustment in the apparatus of FIG. 1.

On the other hand, the second delaying portion 42 delays the received pulse by a time interval equal to the given interval plus the time lag (the delay time) measured by the block 120. The given interval is equal to 30 nsec, that is, three periods of the second clock signal generated by the frequency-multiplying clock oscillator 34. The second delaying portion 42 outputs the delayed pulse to the latch circuit 44. The timing of the outputting of the delayed pulse from the second delaying portion 42 follows the timing of the outputting of the delayed pulse from the first delaying portion 41 by a time interval equal to 30 nsec, that is, three periods of the second clock signal. Therefore, as shown in FIG. 8, the latch circuit 44 latches the output signal of the comparator 30 at a timing which is approximately equal to the center of the 50-nsec duration of the output pulse (the cancel signal) from the first variable-gain amplifier 21. In the case where the low pass filter 28 causes a significant signal delay, the output signal of the comparator 30 may be latched at a further delayed timing.

A step 240 following the step 230 reads out the comparator output signal latched by the latch circuit 44. A step 250 subsequent to the step 240 determines whether or not the comparator output signal is in its high-level state. When the comparator output signal is in its low-level state, it is thought that the gain G1 of the first variable-gain amplifier 21 is greater than a proper value, and hence a scattered-light component is removed from the received signal to an undue extent. In this case, it is decided that the gain G1 should be reduced by a unit, and the program advances from the step 250 to a step 260. On the other hand, when the comparator output signal is in its high-level state, the program advances from the step 250 to a step 280.

The step 260 determines whether or not the gain G1 of the first variable-gain amplifier 21 has already reached its lower limit value. When the gain G1 has already reached its lower limit value, the gain G1 can not be further reduced. In this case, the program jumps from the step 260 to a step 300. On the other hand, when the gain G1 has not yet reached its lower limit value, the program advances from the step 260 to a step 270. The step 270 reduces the gain G1 by a unit. After the step 270, the program advances to the step 300.

When the step 250 determines that the comparator output signal is in its high-level state, it is thought that the gain G1 of the first variable-gain amplifier 21 is smaller than the proper value and hence a scattered-light component is insufficiently removed from the received signal. In this case, it is decided that the gain G1 should be increased by a unit, and the program advances from the step 250 to the step 280.

The step 280 determines whether or not the gain G1 of the first variable-gain amplifier 21 has already reached its upper limit value. When the gain G1 has already reached its upper limit value, the gain G1 can not be further increased. In this case, the program jumps from the step 280 to the step 300. On the other hand, when the gain G1 has not yet reached its upper limit value, the program advances from the step 280 to a step 290. The step 290 increases the gain G1 by a unit. After the step 290, the program advances to the step 300.

The step 300 increments the counter value "i" by "+1". The counter value "i" indicates the number of times of the execution of the gain adjustment by the steps 230–290. A step 310 following the step 300 determines whether or not the counter value "i" reaches "10". When the counter value "i" does not reach "10", that is, when the counter value "i" is smaller than "10", the program returns from the step 310 to the step 230. In this case, the gain adjustment by the steps 230–290 is executed again. On the other hand, when the counter value "i" reaches "10", that is, when the counter value "i" is equal to or greater than "10", the program exits from the step 310 and then advances from the sub block 152 to the sub block 154 (see FIG. 3).

Figure 9:
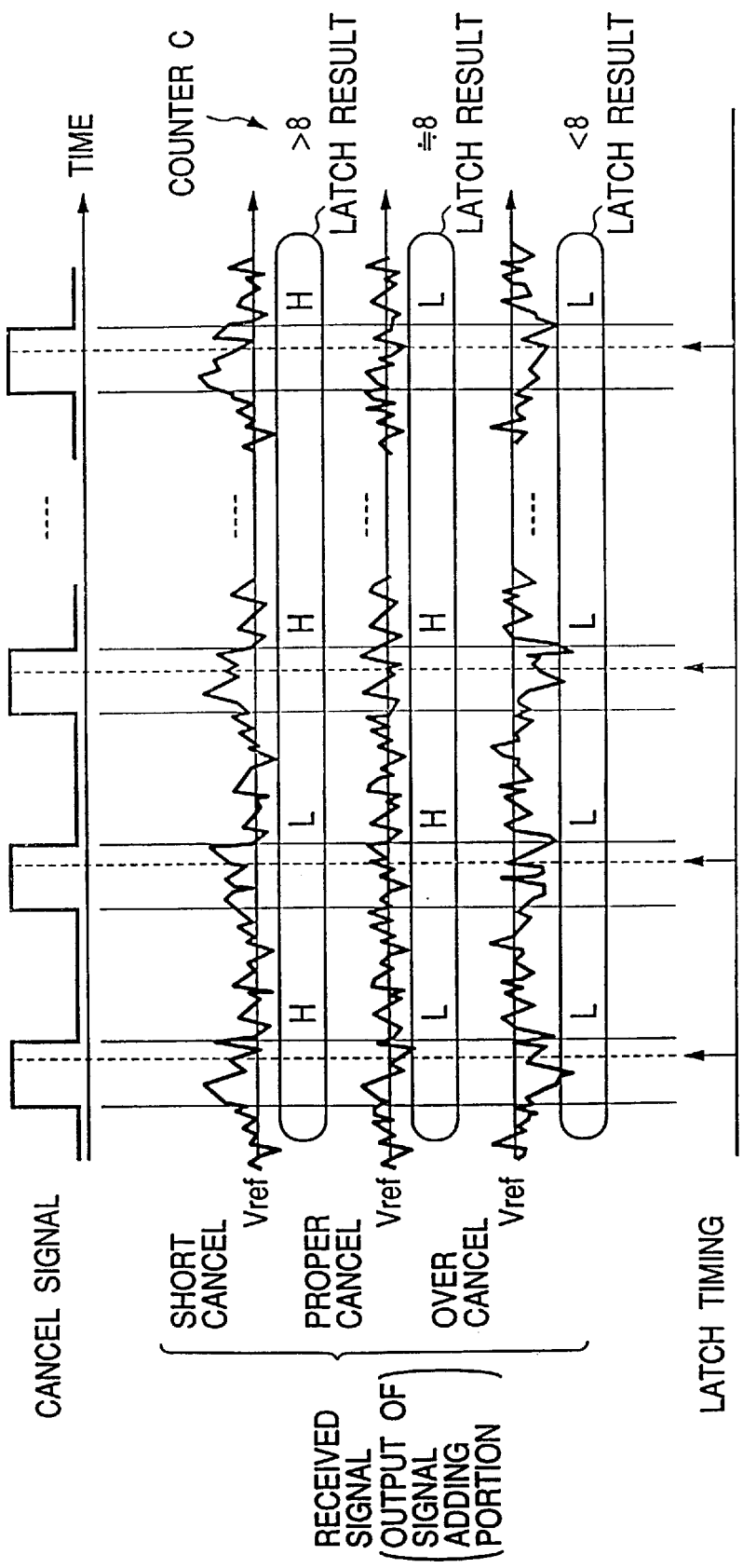
FIG. 9 is a time-domain diagram of a cancel signal, a received signal, and a latch timing in the apparatus of FIG. 1.

According to the scattered-light-component canceling process implemented by the sub block 152, the cancel signal whose level is adjusted by the first variable-gain amplifier 21 is controlled at or around an optimal value with an error corresponding to the magnitude of white noise in the apparatus as shown in FIG. 9.

The scattered-light-component canceling process repetitively adjusts the gain G1 of the first variable-gain amplifier 21 ten times for the following reason. It is assumed that the intensity of a received scattered light beam corresponds to the magnitude of white noise which is multiplied by about ten or less. The accuracy per unit in the gain of the first variable-gain amplifier 21 is set to about twice the effective value of the magnitude of white noise. The first variable-gain amplifier 21 is designed so that the gain thereof can be adjusted among ten different values.

In the case where a stronger scattered light beam is intended to be canceled, the gain of the first variable-gain amplifier 21 may be adjusted among eleven or more different values. In addition, the number of times of the execution of the gain adjustment may be equal to eleven or more. Preferably, the upper limit value of the gain of the first variable-gain amplifier 21 is chosen so that a desired signal component corresponding to an echo beam caused by a preceding target object will not be canceled.

As previously mentioned, the scattered-light-component canceling process reiterates the gain adjustment by the steps 230–290. Accordingly, there is a chance that an echo beam caused by reflection of a previous forward laser beam at a preceding target object and a scattered light beam caused by reflection of the present forward laser beam at an obstacle (a jammer) reach the light receiving portion 16 at substantially the same time. In such a case, it tends to be difficult to generate a cancel signal which corresponds only to a scattered light beam. To remove such a problem, the step 230 is designed so that the intervals between the timings of single-pulse generation by the pulse generating portion 12 in the respective gain adjustments will be different from each other. Thus, the cancel signal for removing a scattered-light signal component can be set to an optimal level.

The averaging process by the sub block 154 is executed after the adjustment of the gain of the first variable-gain amplifier 21 by the scattered-light-component canceling process (the sub block 152). The averaging process further adjusts the gain of the first variable-gain amplifier 21 (the gain G1). The averaging process provides a plurality of adjustment-resultant values of the gain G1 during the further adjustment. The averaging process calculates a mean value among the adjustment-resultant values of the gain G1. The averaging process determines a final desired value of the gain G1 on the basis of the calculated mean value. The averaging process is implemented for the following reason.

The scattered-light-component canceling process (the sub block 152) sets the gain G1, that is, the gain of the first variable-gain amplifier 21, with an error of ±1 unit. If a gain reduction by one unit is erroneously executed instead of a gain increase by one unit at a final stage due to white noise, the last gain G1 differs from a proper value by two units. To compensate for such an error of the gain G1 in the scattered-light-component canceling process (the sub block 152), the averaging process further implements adjustment of the gain G1 a plurality of times, for example, four times, and thereby provides adjustment-resultant values of the gain G1. The averaging process calculates a mean value among the adjustment-resultant values of the gain G1. The averaging process determines a final desired value of the gain G1 on the basis of the calculated mean value.

As shown in FIG. 5, a first step 410 of the sub block 154 sets a gain sum $\Sigma G1$ to an initial value, that is, "0". The gain sum $\Sigma G1$ indicates the sum of adjustment-resultant values of the gain G1. A step 420 following the step 410 sets a counter value "i" to an initial value, that is, "1". The counter value "i" indicates the number of times of adjustment of the gain G1. After the step 420, the program advances to a step 430.

The step 430 and subsequent steps 440, 450, 460, 470, 480, and 490 are similar to the steps 230, 240, 250, 260, 270, 280, and 290 in the scattered-light-component canceling process (the sub block 152) respectively. The steps 430–490 execute adjustment of the gain G1 similarly to the steps 230–290. When the adjustment of the gain G1 has been completed, the program advances to a step 500.

The step 500 increments the counter value "i" by "+1". The counter value "i" indicates the number of times of the execution of the gain adjustment by the steps 430–490. A step 510 following the step 500 adds the present value (the present adjustment-resultant value) of the gain G1 to the gain sum $\Sigma G1$ according to a program statement "$\Sigma G1 = \Sigma G1 + G1$".

A step 520 subsequent to the step 510 determines whether or not the counter value "i" reaches "4". When the counter value "i" does not reach "4", that is, when the counter value "i" is smaller than "4", the program returns from the step 520 to the step 430. In this case, the gain adjustment by the steps 430–490 is executed again. On the other hand, when the counter value "i" reaches "4", that is, when the counter value "i" is equal to or greater than "4", the program advances from the step 520 to a step 530.

The step 530 divides the gain sum $\Sigma G1$ by "4", that is, the number of times of the execution of the gain adjustment. The step 530 sets the gain G1 to the result of the division. The step 530 sets the actual gain of the first variable-gain amplifier 21 equal to the calculated value G1. In other words, the step 530 calculates a mean value among the adjustment-resultant values of the gain G1. The step 530 sets a final desired value of the gain G1 equal to the calculated mean value. The step 530 sets the actual gain of the first variable-gain amplifier 21 equal to the final desired value of the gain G1. After the step 530, the execution of the sub block 154 ends.

The averaging process by the sub block 154 repeats the adjustment of the gain of the first variable-gain amplifier 21 four times. Thereby, the averaging process provides four adjustment-resultant values of the gain G1. The averaging process calculates a mean value among the four adjustment-resultant values of the gain G1. The averaging process sets a final desired value of the gain G1 equal to the calculated mean value. The averaging process sets the actual gain of the first variable-gain amplifier 21 equal to the final desired value of the gain G1. Accordingly, an error of the gain of the first variable-gain amplifier 21 (an error of the cancel signal whose level is adjusted by the first variable-gain amplifier 21) can be surely limited to within ±1 unit.

The gain adjustment by the block 160 in FIG. 2 is designed so that the second variable-gain amplifier 22 can generate a cancel signal for suppressing a scattered-light component in the received signal (the output signal of the preamplifier 18) to a level lower than white noise in the apparatus.

Figure 6:
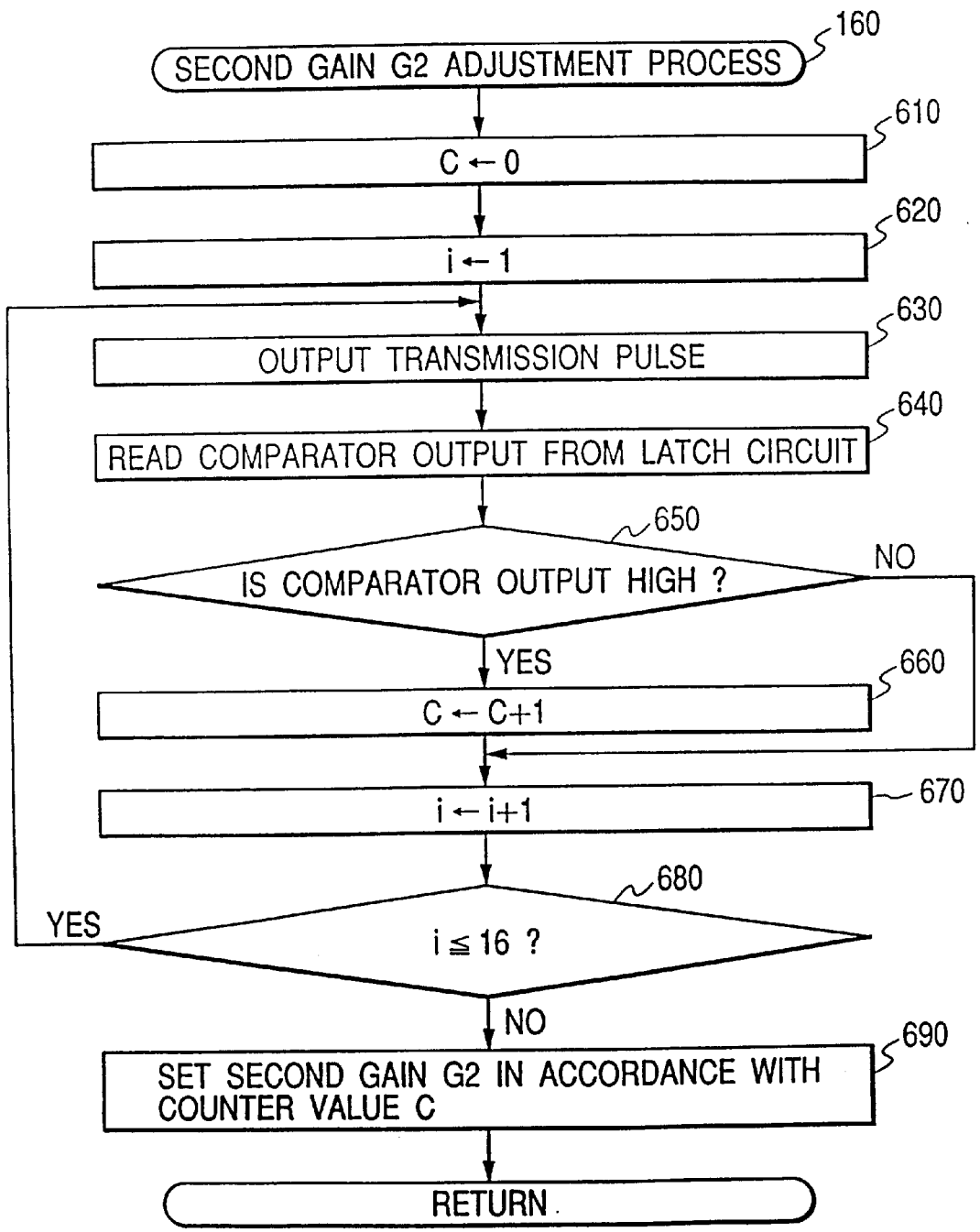
FIG. 6 is a flowchart of a second gain adjustment block in FIG. 2.

As shown in FIG. 6, a first step 610 of the block 160 clears a counter value C to "0". The counter value C indicates the number of times the output signal of the comparator 30 is detected to be in its high-level state. A step 620 following the step 610 sets a counter value "i" to an initial value, that is, "1". The counter value "i" indicates the number of times of measurement of a scattered light beam. After the step 620, the program advances to a step 630.

The step 630 is similar to the step 230 in FIG. 4. The step 630 controls the pulse generating portion 12 to produce a single pulse in synchronism with the reference clock signal. The single pulse has a width of 50 nsec. The pulse generating portion 12 outputs the single pulse to the light emitting portion 14. The light emitting portion 14 outputs a forward laser beam in response to the single pulse. In addition, the step 630 controls the reference voltage generating portion 32 to set the reference voltage Vref to a DC level of the received signal outputted from the low pass filter 28. The reference voltage Vref is applied to the comparator 30. The setting of the reference voltage Vref to the DC level is to allow an accurate determination about a condition of the cancel of a scattered-light component from the output signal of the comparator 30.

As will be made clear later, the step 630 is executed a plurality of times. Accordingly, there is a chance that an echo beam caused by reflection of a previous forward laser beam at a preceding target object and a scattered light beam caused by reflection of the present forward laser beam at an obstacle (a jammer) reach the light receiving portion 16 at substantially the same time. In such a case, it tends to be difficult to generate a cancel signal which corresponds only to a scattered light beam. To remove such a problem, the step 630 is designed so that the intervals between the timings of single-pulse generation by the pulse generating portion 12 will be different from each other. Thus, the cancel signal for removing a scattered-light signal component can be set to an optimal level.

It is assumed that an obstacle (a jammer) to distance measurement such as a group of raindrops, a fog, or a spray of water occurs between the present vehicle and a preceding target object. The obstacle reflects the forward laser beam. The reflection of the forward beam thereat causes a scattered light beam or an undesired echo beam which returns to the apparatus. In this case, the light receiving portion 16 outputs a scattered-light received signal at a timing which follows the moment of the emission of the forward laser beam by a time interval equal to the time lag or the delay time measured by the block 120.

The first delaying portion 41 and the second delaying portion 42 receive the single pulse from the pulse generating portion 12. The first delaying portion 41 delays the received pulse by a time interval equal to the delay time measured by the block 120. The first delaying portion 41 outputs the delayed pulse to the first variable-gain amplifier 21 and the second variable-gain amplifier 22. The first variable-gain amplifier 21 attenuates the delayed pulse at the gain G1, and outputs the resultant pulse to the signal adding portion 24 as a cancel signal. The second variable-gain amplifier 22 attenuates the delayed pulse at the gain G2, and outputs the resultant pulse to the signal adding portion 24 as a cancel signal. The signal adding portion 24 mixes or combines the output signal of the preamplifier 18 (the scattered-light received signal), the output pulse from the first variable-gain amplifier 21, and the output pulse from the second variable-gain amplifier 22. At this time, since the gain G2 of the second variable-gain amplifier 22 is equal to "0", the received signal is not affected by the output signal of the second variable-gain amplifier 22 when passing through the signal adding portion 24. The output signal of the first variable-gain amplifier 21 is subtracted from the received signal in the signal adding portion 24. In other words, the received signal is reduced by a signal level corresponding to the output pulse from the first variable-gain amplifier 21.

On the other hand, the second delaying portion 42 delays the received pulse by a time interval equal to the given interval plus the delay time measured by the block 120. The given interval is equal to 30 nsec, that is, three periods of the second clock signal generated by the frequency-multiplying clock oscillator 34. The second delaying portion 42 outputs the delayed pulse to the latch circuit 44. The timing of the outputting of the delayed pulse from the second delaying portion 42 follows the timing of the outputting of the delayed pulse from the first delaying portion 41 by a time interval equal to 30 nsec, that is, three periods of the second clock signal. Therefore, the latch circuit 44 latches the output signal of the comparator 30 at a timing which is approximately equal to the center of the 50-nsec duration of the output pulse (the cancel signal) from the first variable-gain amplifier 21. In the case where the low pass filter 28 causes a significant signal delay, the output signal of the comparator 30 may be latched at a further delayed timing.

A step 640 following the step 630 reads out the comparator output signal latched by the latch circuit 44. A step 650 subsequent to the step 640 determines whether or not the comparator output signal is in its high-level state. When the comparator output signal is in its high-level state, the program advances from the step 650 to a step 660. On the other hand, when the comparator output signal is in its low-level state, the program jumps from the step 650 to a step 670. The step 660 increments the counter value C by "+1". After the step 660, the program advances to the step 670.

The step 670 increments the counter value "i" by "+1". The counter value "i" indicates the number of times of the execution of the scattered-light measurement by the steps 630–660. A step 680 following the step 670 determines whether or not the counter value "i" reaches "16". When the counter value "i" does not reach "16", that is, when the counter value "i" is smaller than "16", the program returns from the step 680 to the step 630. In this case, the scattered-light measurement by the steps 630–660 is executed again. On the other hand, when the counter value "i" reaches "16", that is, when the counter value "i" is equal to or greater than "16", the program advances from the step 680 to a step 690.

The step 690 determines a desired value of the gain G2 of the second variable-gain amplifier 22 on the basis of the counter value C, that is, the number of times the output signal of the comparator 30 is detected to be in its high-level state. The step 690 sets the actual gain of the second variable-gain amplifier 22 equal to the desired value of the gain G2. After the step 690, the program advances from the block 160 to the block 170 (see FIG. 2). Specifically, the ROM within the microcomputer 50 stores data representing a map of the relation between the counter value C and the desired value of the gain G2. This relation is designed so that the desired value of the gain G2 will provide a condition equivalent to the condition where the counter value C being equal to the central value "8" is available. The desired value of the gain G2 is determined by referring to the map in response to the counter value C.

As shown in FIG. 9, in the case where the first gain (G1) adjustment process by the block 150 enables the first variable-gain amplifier 21 to output a proper cancel signal, the counter value C is equal to about the central value "8". When the cancel signal outputted from the first variable-gain amplifier 21 has an insufficient magnitude, the counter value C is greater than the central value "8". When the cancel signal outputted from the first variable-gain amplifier 21 has an extremely insufficient magnitude, the counter value C is equal to the maximum value "16". On the other hand, when the cancel signal outputted from the first variable-gain amplifier 21 has an over-magnitude, the counter value C is smaller than the central value "8". When the cancel signal outputted from the first variable-gain amplifier 21 has an extremely great magnitude, the counter value C is equal to the minimum value "0". Accordingly, a determination about whether or not the cancel signal outputted from the first variable-gain amplifier 21 is proper in magnitude can be executed on the basis of the counter value C.

As previously mentioned, there is a map for determining the desired value of the gain G2 which corresponds to a condition where the counter value C being equal to the central value "8" is available. The step 690 accesses the map in response to the counter value C, thereby determining the desired value of the gain G2. Then, the step 690 sets the actual gain of the second variable-gain amplifier 22 equal to the desired value of the gain G2.

Therefore, a resultant of the cancel signal outputted from the first variable-gain amplifier 21 and the cancel signal outputted from the second variable-gain amplifier 22 has an optimal level at which a scattered-light signal component is suppressed to a level of white noise by the signal adding portion 24. Thus, the distance measurement process by the block 170 can accurately measure the distance between the present vehicle and a preceding target object without being adversely affected by a scattered light beam.

An increase in the gain G2 enlarges the cancel signal outputted from the second variable-gain amplifier 22. On the other hand, a decrease in the gain G2 reduces the cancel signal outputted from the second variable-gain amplifier 22. At a start of the second gain adjustment process by the block 160, the gain G2 is equal to "0". Therefore, the gain G2 can be increased from "0" by the map-based gain setting process (the step 690) but can not be decreased from "0". Accordingly, in the case where the counter value C is smaller than the central value "8" and the resultant of the cancel signal outputted from the first variable-gain amplifier 21 and the cancel signal outputted from the second variable-gain amplifier 22 is required to decrease, the step 690 reduces the gain G1 by a unit and suitably sets the gain G2. In this case, after the gain G1 is reduced by a unit, the program may be returned to the step 610 to execute the second gain adjustment process again. Alternatively, the block 150 (see FIG. 2) for adjusting the gain G1 may set the gain G2 to the central value "8". In this case, the gain G2 can be reduced by the step 690.

As previously mentioned, the second gain adjustment process by the block 160 sets the gain G2 in response to the counter value C. The second gain adjustment process enables a scattered-light signal component to be suppressed to a level of white noise by the signal adding portion 24. To raise the accuracy of the setting of the gain G2 (the accuracy of the setting of the cancel signal outputted from the second variable-gain amplifier 22), the number of times of the execution of the scattered-light measurement may be greater than "16".

The magnitude of white noise in the apparatus depends on a factor such as a temperature. To set the gain G2 to a proper value regardless of the magnitude of white noise, it is preferable that the map used for determining the desired value of the gain G2 on the basis of the counter value C is updated in accordance with the magnitude of white noise.

The updating of the map is implemented as follows. Firstly, the gain G1 of the first variable-gain amplifier 21 is set to "0". The light emitting portion 14 is suspended by cutting off the power feed thereto. Under these conditions, the gain G2 of the second variable-gain amplifier 22 is sequentially changed among different values. For each of the gain values, the process by the steps 630–680 is executed. Thus, for each of the values of the gain G2 of the second variable-gain amplifier 22 to reduce the signal level of white noise, measurement is made about the number of times (the counter value C) the output signal of the comparator 30 is detected to be in its high-level state. The result of this measurement teaches a relation between the counter value C and a value of the gain G2 which enables the counter value C to be equalized to the central value "8". Accordingly, the map for determining the desired value of the gain G2 is updated in response to the measurement result. As a result, the step 690 can set the gain G2 to a proper value regardless of the magnitude of white noise.

With reference back to FIG. 2, the block 170 implements a distance measurement process using a spread spectrum technique. Specifically, the block 170 measures the distance between the present vehicle and a preceding target object (a preceding vehicle) according to a spread spectrum technique. The block 170 is basically similar to the step 120 except for design changes as follows. The block 170 controls the pulse generating portion 12 to produce a 127-bit maximum length code. The 127-bit maximum length code enables the apparatus to detect a weak echo beam. The light emitting portion 14 outputs a forward laser beam in response to the 127-bit maximum length code. The block 170 controls the peak detector 38 to execute peak detection only for a time interval (a detection time interval) of 0 nsec to 2 $\mu$sec after the end of the emission of the forward laser beam from the light emitting portion 14. This setting of the detection time interval allows the detection of a preceding target object (a preceding vehicle) which is distant from the present vehicle by 300 m or less.

During the distance measurement process by the block 170, the light emitting portion 14 outputs the forward laser beam in response to the 127-bit maximum length code. In the presence of a preceding target object such as a preceding vehicle exposed to the forward laser beam, the forward laser beam is reflected thereat and hence an echo beam is caused which returns to the light receiving portion 16. The light receiving portion 16 generates and outputs a received signal corresponding to the echo beam. In the case where an obstacle (a jammer) to distance measurement such as a group of raindrops, a fog, or a spray of water occurs between the present vehicle and the preceding target object, the forward laser beam is reflected at the obstacle and hence a scattered light beam or an undesired echo beam is caused which returns to the apparatus. In this case, a component corresponding to the scattered light beam (the undesired echo beam) is superimposed on the received signal outputted from the signal receiving portion 16.

The received signal is transmitted from the signal receiving portion 16 to the comparator 30 via the preamplifier 18, the signal adding portion 24, the fixed-gain amplifier 26, and the low pass filter 28. In the presence of an obstacle (a jammer) to distance measurement, the processes by the blocks 140, 150, and 160 is preliminarily implemented so that the first variable-gain amplifier 21 and the second variable-gain amplifier 22 output the cancel signals to the signal adding portion 24. The cancel signals are designed to cancel a scattered-light component from the received signal. The signal adding portion 24 subtracts the cancel signals from the received signal, thereby removing the scattered-light component from the received signal. Therefore, the signal outputted from the low pass filter to the comparator 30 is free from the scattered-light component. In other words, the signal outputted from the low pass filter to the comparator 30 has substantially only a component correspond to the echo beam caused by the preceding target object.

The comparator 30 converts the output signal of the low pass filter 28 into a binary signal. The comparator 30 outputs the binary signal to the matched filter 36. The matched filter 36 calculates the value of a correlation between the transmitted maximum length code and the binary signal. Since the binary signal is free from the scattered-light component, the correlation value calculated by the matched filter 36 accurately reflects a correlation between the forward laser beam outputted from the light emitting portion 14 and the echo beam received by the light receiving portion 16. The reference voltage Vref applied to the comparator 30 at this time is set to the DC level of the output signal of the low pass filter 28.

During the distance measurement process by the block 170, the peak detector 38 detects a moment (a peak-occurrence moment) at which the correlation value calculated by the matched filter 36 is maximized. The detected peak-occurrence moment is independent of the scattered light beam. Thus, the detected peak-occurrence moment accurately corresponds to the time interval between the moment of the emission of the forward laser beam and the moment of the reception of the echo beam caused by the preceding target object (the preceding vehicle). Also, the peak detector 38 detects the maximum correlation value (the peak correlation value). The peak detector 38 informs the microcomputer 50 of the detection results, that is, the peak-occurrence moment and the peak correlation value.

During the distance measurement process by the block 170, the microcomputer 50 compares the peak correlation value with the threshold value to determine whether or not the preceding target object (the preceding vehicle) is actually present. When the peak correlation value is equal to or greater than the threshold value, that is, when the preceding target object is determined to be actually present, the microcomputer 50 calculates the distance between the present vehicle and the preceding target object from the peak-occurrence moment. When the peak correlation value is smaller than the threshold value, that is, when the preceding target object is determined to be absent, the microcomputer 50 does not execute the distance calculation.

As previously mentioned, the preliminary process by the block 120–160 is implemented before the main distance measurement process is executed by the block 170. During the preliminary process, the laser light beam is actually outputted from the light emitting portion 14, and a determination is made about whether or not a scattered light beam from an obstacle (for example, a group of raindrops or a fog) is received by the light receiving portion 16. In the case where a scattered light beam is received by the light receiving portion 16, the delay time of the first delaying portion 41 and the gains of the first variable-gain amplifier 21 and the second variable-gain amplifier 22 are set in response to the time lag of a scattered-light received signal relative to the moment of the emission of the forward laser beam, and also the level of the scattered-light received signal. During the main distance measurement process which follows the preliminary process, the first delaying portion 41 operates at the delay time set in the preliminary process while the first variable-gain amplifier 21 and the second variable-gain amplifier 22 operate at the gains set in the preliminary process. During the main distance measurement process, the first variable-gain amplifier 21 and the second variable-gain amplifier 22 output the cancel signals for removing a scattered-light component from the received signal. The signal adding portion 24 subtracts the cancel signals from the received signal so that the scattered-light component is removed from the received signal. Accordingly, the main distance measurement process can accurately measure the distance between the present vehicle and the preceding target object (the preceding vehicle) without being adversely affected by the scattered light beam.

The first variable-gain amplifier 21 and the second variable-gain amplifier 22 adjust the levels of the cancel signals. The gain of the first variable-gain amplifier 21 can be adjusted stepwise at an accuracy comparable to the level of white noise in the apparatus. In other words, the gain of the first variable-gain amplifier 21 can be adjusted stepwise at a resolution comparable to the white noise level. On the other hand, the gain of the second variable-gain amplifier 22 can be adjusted stepwise at an accuracy higher than that corresponding to the level of white noise in the apparatus. In other words, the gain of the second variable-gain amplifier 22 can be adjusted stepwise at a resolution higher than that corresponding to the white noise level. The gains of the first variable-gain amplifier 21 and the second variable-gain amplifier 22 are optimized while a scattered-light signal component is actually canceled. Accordingly, during the main distance measurement process, the cancel signals outputted from the first variable-gain amplifier 21 and the second variable-gain amplifier 22 suppress a scattered-light signal component to a level equal to or less than the level of white noise in the apparatus.

Thus, it is possible to prevent rain-caused or fog-caused wrong distance measurement without reducing good distance measurement performances such as a high sensitivity and a high anti-noise characteristic provided by the spread spectrum technique. Therefore, the distance measurement apparatus of FIG. 1 has a high reliability.

The upper limit values of the gains of the first variable-gain amplifier 21 and the second variable-gain amplifier 22 are chosen so that the level of a resultant of the cancel signals outputted therefrom will be prevented from exceeding the maximum level of a scattered-light signal component. Thus, even in the case where an echo beam from a preceding target object close to the present vehicle is erroneously detected as a scattered light beam, the cancel signals are prevented from nullifying an echo-beam signal component. Accordingly, it is also possible to accurately measure a distance regarding a preceding target object close to the present vehicle.

Second Embodiment

A second embodiment of this invention is similar to the first embodiment thereof except that the adjustment of the gain of the first variable-gain amplifier 21 is implemented by an exclusive gain control circuit rather than the microcomputer 50, and that the counter value C is provided by an exclusive hardware counter rather than the microcomputer 50. The processing load on the microcomputer 50 in the second embodiment of this invention is smaller than that in the first embodiment thereof.

Third Embodiment

A third embodiment of this invention is similar to the first embodiment or the second embodiment thereof except that distance measurement uses the transmission and reception of an electromagnetic wave which is not based on a spread spectrum technique.

What is claimed is:

1. A distance measurement apparatus comprising:
   transmitting means for transmitting a forward electromagnetic wave;
   receiving means for receiving an echo wave caused by reflection of the forward electromagnetic wave at an object, and converting the received echo wave into a first received signal;

scattered-wave detecting means for detecting a scattered wave reaching the receiving means and caused by reflection of the forward electromagnetic wave at an obstacle which occurs prior to the reflection of the forward electromagnetic wave at the abject;

cancel-signal generating means for generating a cancel signal to cancel a scattered-wave-corresponding component of the first received signal generated by the receiving means in response to the scattered wave detected by the scattered-wave detecting means;

scattered-wave canceling means for removing the scattered-wave-corresponding component from the first received signal in response to the cancel signal generated by the cancel-signal generating means to change the first received signal to a second received signal; and distance calculating means responsive to the second received signal for measuring a time interval between a moment of the transmission of the forward electromagnetic wave by the transmitting means and a moment of the reception of the echo wave by the receiving means, and calculating a distance to the object on the basis of the measured time interval.

2. A distance measurement apparatus as recited in claim 1, wherein the scattered-wave detecting means comprises means for measuring a strength of the scattered-wave-corresponding component of the first received signal, and means for measuring a delay time between the moment of the transmission of the forward electromagnetic wave by the transmitting means and a moment of the reception of the scattered wave by the receiving means, and wherein the cancel-signal generating means comprises means for generating the cancel signal on the basis of the strength and the delay time measured by the scattered-wave detecting means and at a timing corresponding to the moment of the reception of the scattered wave by the receiving means.

3. A distance measurement apparatus as recited in claim 1, wherein the transmitting means comprises pseudo-random-noise-code generating means for a pseudo random noise code having a predetermined bit length, means for modulating an electromagnetic wave into a modulated electromagnetic wave in response to the pseudo random noise code, and means for transmitting the modulated electromagnetic wave as the forward electromagnetic wave, and wherein the distance calculating means comprises demodulating means for demodulating the second received signal into a binary signal, correlation calculating means for calculating a value of a correlation between the binary signal and the pseudo random noise code used by the transmitting means, means for detecting a peak-occurrence moment at which the calculated correlation value is maximized, and means for calculating the distance to the object from the detected peak-occurrence moment.

4. A distance measurement apparatus as recited in claim 3:

wherein the scattered-wave detecting means comprises means for causing the transmitting means to transmit a forward electromagnetic wave modulated in response to a pseudo random noise code, means for measuring a time interval between a moment of the transmission of the forward electromagnetic wave by the transmitting means and a moment at which the correlation value calculated by the correlation calculating means, delay time setting means for setting the measured time interval as the delay time, means for causing the transmitting means to transmit the forward electromagnetic wave, and signal-level measuring means for detecting a level of the first received signal, generated by the receiving means at a moment the delay time after the moment of the transmission of the forward electromagnetic wave by the transmitting means, as a level of a scattered-wave signal component; and wherein the cancel-signal generating means comprises for delaying the pseudo random noise code by the delay time set by the delay time setting means after the transmitting means starts to transmit the forward electromagnetic wave which is modulated in response to the pseudo random noise code, level adjusting means for controlling a signal level of a pseudo random noise code outputted from the delaying means to the scattered-wave signal level detected by the signal-level measuring means, and means for applying an output signal of the level adjusting means to the scattered-wave canceling means as the cancel signal.

5. A distance measurement apparatus as recited in claim 4:

wherein the level adjusting means comprises first level adjusting means for adjusting the signal level of the pseudo random noise code outputted from the delaying means at an accuracy comparable to a signal level of white noise, and second level adjusting means for adjusting the signal level of the pseudo random noise code outputted from the delaying means at an accuracy finer than the signal level of white noise; and wherein the signal-level measuring means comprises first level setting means for causing the transmitting means to transmit the forward electromagnetic wave, for causing the delaying means and the scattered-wave canceling means to operate, for changing a quantity of the level adjustment by the first level adjusting means in response to a value of the binary signal generated by the demodulating means the delay time thereafter, and thereby setting the quantity of the level adjustment by the first level adjusting means so that the binary signal generated by the demodulating means will be evenly in its high-level state and its low-level state, and second level setting means for causing the transmitting means to transmit the forward electromagnetic wave after the first level setting means sets the quantity of the level adjustment, for causing the delaying means and the scattered-wave canceling means to operate, for measuring the binary signal generated by the demodulating means a plurality of times, for calculating a number of times the measured binary signal is in one of its high-level state and its low-level state during the plural-times measurement of the binary signal, and for setting a quantity of the level adjustment by the second level adjusting means in response to the calculated number of times so that a level of a signal from which a scattered-wave component has been removed and which is inputted into the demodulating means will be smaller than the signal level of white noise.

6. A distance measurement apparatus as recited in claim 1, wherein the cancel-signal generating means comprises means for limiting a level of the cancel signal to a predetermined upper limit.

* * * * *